Patented Jan. 14, 1941

2,228,407

UNITED STATES PATENT OFFICE 2,228,407

EMULSIFIABLE DISINFECTANT

Reuben Schuler and Francis M. Archibald, Elizabeth, N. J., assignors to Stanco, Inc.

No Drawing. Application April 3, 1937,
Serial No. 134,839

1 Claim. (Cl. 167—29)

This invention relates to the preparation of disinfectants, particularly to disinfectant preparations that will readily emulsify with water.

Disinfectants may be divided into two classes, one composed of those compounds that may be used without dilution and the second class composed of those which are diluted before being used, although as a rule most disinfectants are diluted to improve spreading over a large area with a given quantity of the disinfectant compound. The preferred disinfectant used according to this invention includes any benzenoid compound having a hydroxy group and all its halogenated and alkylated derivatives and will hereafter be referred to as phenolic compounds. They generally dissolve easily in most organic liquids but are only sparingly soluble in cold water which is the diluent that is preferred.

The phenolic compounds, especially when dissolved in an oil such as a mineral oil, on mixing with water, do not readily form emulsions. If emulsifiers, such as alkali metal salts of oil soluble sulfonic acids, are added to a phenolic compound, on mixing with water, emulsions do not readily form even though vigorously stirred, for as soon as the stirring is discontinued, a separation of the water from the phenolic compounds in solution readily takes place.

An object of this invention is to prepare a disinfectant preparation containing phenolic compounds which, on being mixed with water, readily form emulsions.

According to this invention, it has been found that if an alcohol is added to a mixture of a phenolic compound and an oil soluble sulfonate produced by treating a mineral oil with sulfuric acid, on mixing with water, an emulsion is readily formed. The presence of mineral oil does not affect the emulsion. The alcohol in this instance aids the emulsification.

The following examples are clear oil solutions which may be readily emulsified with water:

Example 1

| | Per cent by weight |
|---|---|
| Tar acid oil (15–18% phenolic content) | 75 |
| Oil-soluble sulfonate | 11 |
| Mineral oil | 4 |
| Isopropyl alcohol | 10 |

Example 2

| | |
|---|---|
| Oil-soluble sulfonate | 11 |
| Thymol | 5 |
| Eucalyptol | 5 |
| Isopropyl alcohol | 20 |
| Kerosene | 59 |

The proportions of above disinfectants in water may be varied over a wide range from 1–50% disinfectant to 50–99 of water.

Other aliphatic alcohols may be used, such as methyl, ethyl or butyl. Higher alcohols are not so well suited because they are not readily miscible with water. The preferred alcohols are readily miscible with water. The preferred alcohols are methyl, ethyl and isopropyl, although butyl alcohol may be used.

It is not the intention to be limited to the exact percentages of the compositions disclosed in the examples. Other percentages may be used as well as other phenolic derivatives. It is the intention to claim the invention as broadly as the prior art permits.

We claim:

A disinfectant preparation that readily emulsifies when mixed with water to form a permanent emulsion, which consists of 75% by weight of tar acid oil containing 15–18% of phenolic compounds, 11% of an oil-soluble sulfonate produced by treating a mineral oil with sulfuric acid, 4% of mineral oil and 10% of isopropyl alcohol.

REUBEN SCHULER.
FRANCIS M. ARCHIBALD.